United States Patent
McKenna

(10) Patent No.: US 7,610,627 B1
(45) Date of Patent: Oct. 27, 2009

(54) SECURE DATA EXCHANGE TECHNIQUE

(75) Inventor: Eugene William McKenna, San Mateo, CA (US)

(73) Assignee: Acxiom Corporation, Little Rock, AR (US)

( * ) Notice: Subject to any disclaimer, the term of this patent is extended or adjusted under 35 U.S.C. 154(b) by 680 days.

(21) Appl. No.: 10/865,180

(22) Filed: Jun. 9, 2004

Related U.S. Application Data

(60) Provisional application No. 60/539,016, filed on Jan. 23, 2004.

(51) Int. Cl.
*G06F 7/04* (2006.01)
(52) U.S. Cl. ............................. 726/26; 726/22; 713/168
(58) Field of Classification Search .................... 726/26
See application file for complete search history.

(56) References Cited

U.S. PATENT DOCUMENTS

2004/0148506 A1* 7/2004 Prince ........................ 713/176

2005/0005164 A1* 1/2005 Syiek et al. .................. 713/201

OTHER PUBLICATIONS

Mihir Bellare, Ran Canetti, Hugo Krawczyk, "Keying Hash Functions for Message Authentication", Proceedings of the 16th Annual International Cryptology Conference on Advances in Cryptology, p. 1-15, Aug. 18-22, 1996.*
Wayner, P., "Synchronization," chapter 5 from *Translucent Databases*, pp. 57-68, Flyzone Press (2002).
Secure discovery of community intersections, Nov. 8, 2003, from Brad's life website—http://www.livejournal.com/users/brad/1932689.html pp. 1-7.
Who's my secret crush?, printed from http://www.crushlink.com/ on Oct. 5, 2004.

* cited by examiner

*Primary Examiner*—Ponnoreay Pich
(74) *Attorney, Agent, or Firm*—Townsend and Townsend and Crew LLP

(57) ABSTRACT

Techniques utilizing common encryption approaches for data from multiple parties enable those parties to discover information that is held in common by the parties without disclosing to any party information that is not held in common by the parties. Encrypted information for each party can be compared to determine which encrypted values match, and those encrypted values can be returned to any of the parties such that a party can determine which corresponding data the parties have in common, without having access to any other data of any other parties.

26 Claims, 3 Drawing Sheets

SECURE DATA EXCHANGE TECHNIQUE

CROSS-REFERENCES TO RELATED APPLICATIONS

The present application claims the benefit of U.S. Provisional Patent Application No. 60/539,016 filed Jan. 23, 2004 entitled "SECURE THIRD PARTY INFORMATION SUPPRESSION", the entire contents of which are incorporated herein by reference for all purposes.

BACKGROUND OF THE INVENTION

The present invention relates to information processing techniques, and more particularly to techniques that enable two or more parties to discover mutually held information without disclosing the private or confidential information of the parties.

There are several situations where two parties need to exchange information with one another to determine information that is held in common by both parties. As part of the information exchange, the parties typically also desire that information that is not held in common by the parties (i.e., information that is held by one party but not the other party) be not disclosed to the other party.

One example of such a situation occurs in the email marketing business. The use of electronic mail messages ("emails") as marketing tools has gained widespread popularity in recent years. Emails provide a convenient channel for marketers to reach a large audience of potential consumers. Marketers generate and maintain lists of email addresses and send emails to addresses in the list. The emails may comprise information marketing/advertising vendors' products, hyperlinks (e.g. URLs) to the vendors' websites, and the like. Marketers also commonly run email campaigns targeted against email address lists of another marketer (referred to as the "rental affiliate" or "affiliate"). In such a scenario, the affiliate sends emails on behalf of the marketer to email addresses included in the address list maintained by the affiliate.

The recent enactment of laws aimed to reduce spam is requiring marketers to change the manner in which email campaigns are conducted, especially campaigns targeted against address lists of a rental affiliate. For example, under the recently enacted federal anti-SPAM law ("CAN-SPAM"), emails marketers are required to suppress (i.e., not send emails to) unsubscribed email addresses from all email campaigns they initiate. This includes email campaigns implemented by and targeted against the list of a list rental affiliate.

Accordingly, when a marketer runs an email campaign against a list of email addresses of an affiliate, the new laws require that emails not be sent to email addresses that occur both in the marketer's list of addresses to be suppressed and in the affiliate's list of email addresses. Accordingly, in order to abide by the new laws, it is essential to determine email addresses that occur in the marketer's suppression list and the affiliate's list. These email addresses that are in both lists represent information that is held in common by the two parties, namely the marketer and the affiliate. However, in the process of determining these common addresses, neither the affiliate nor the marketer wants their non-common information (e.g., addresses in the affiliate's list that are not in the marketer's suppression list and email addresses in the marketer's suppression list that are not in the affiliate's list) to be disclosed to the other party.

Historically, affiliates have offered suppression services for an additional fee. Typically, a marketer would send a list of email addresses to be suppressed (the "suppression list") to an affiliate and the affiliate would remove any email addresses found in the suppression list from the affiliate's list prior to conducting the email campaign. However, this approach violates the privacy policies of many marketers, which prohibit them from sharing customer data with third parties such as the affiliate.

According to another technique, the affiliate sends its list of email addresses to the marketer. The marketer then removes email addresses from the affiliate list that are to be suppressed and returns the reduced list of addresses back to the affiliate. The affiliate then conducts email campaigns against only those email addresses in the reduced list received from the marketer. While this approach does not expose the marketer's customer data to the affiliate, it exposes the affiliate's customer data to the marketer. This is generally unacceptable to the affiliate and may violate its privacy policies.

Accordingly, a challenge in implementing suppression of email addresses between an affiliate and a marketer is that both parties view their data as private. Neither the affiliate nor the marketer wishes to disclose their customer and suppression information to the other party, and yet both have to cooperate to meet the legislative requirements of suppressing unsubscribed addresses.

BRIEF SUMMARY OF THE INVENTION

Embodiments of the present invention provide techniques that enable two parties to discover information that is held in common by the parties without disclosing to any party information that is not held in common by the parties.

In one embodiment, the techniques may be applied to the email marketing domain. In this embodiments, techniques according to the teachings of the present invention may be used to determine email addresses that are included in both (i.e., held in common) an affiliate's list of email addresses and a marketer's list of email addresses to be suppressed. Communication of emails to the commonly held email addresses may be suppressed.

According to an embodiment of the present invention, techniques are provided for processing information. In this embodiment, a first set of encrypted strings is accessed, the first set of encrypted strings generated by applying a first encryption function to each plaintext string in a first set of plaintext strings A second set of encrypted strings is accessed, the second set of encrypted strings generated by applying the first encryption function to each plaintext string in a second set of plaintext strings. The first set of encrypted strings are compared with the second set of encrypted strings to determine a third set of encrypted strings comprising one or more encrypted strings that are included in the first set of encrypted strings and included in the second set of encrypted strings.

According to another embodiment of the present invention, techniques are provided for determining common information. A first set of encrypted strings is compared with a second set of encrypted strings to determine a set of matching encrypted strings, wherein the first set of encrypted strings and the second set of encrypted strings comprise encrypted strings generated by applying a first encryption function. A plaintext string is determined corresponding to each encrypted string in the set of matching encrypted strings.

According to yet another embodiment of the present invention, techniques are provided for determining information held in common. A first set of encrypted strings is received comprising encrypted strings generated by applying a first encryption function to each plaintext string in a first set of plaintext strings A second set of plaintext strings is received.

The first encryption function used to generate the first set of encrypted strings from the first set of plaintext strings is determined. The first encryption function is applied to plaintext strings in the second set of plaintext strings to produce a second set of encrypted strings. The first set of encrypted strings is compared with the second set of encrypted strings to determine a third set of encrypted strings comprising one or more encrypted strings that are included both in the first set of encrypted strings and in the second set of encrypted strings.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques that enable two parties to discover information that is held in common by the parties without disclosing to any party information that is not held in common by the parties. As described below, features of the present invention have been described using an embodiment applicable to the email marketing domain. This however is not intended to limit the scope of the present invention as recited in the claims. The teachings of the present invention may also be applied to other areas and domains where two or more parties need to discover information that is held in common by the parties without disclosing information that is not held in common by the parties.

Figure 1:
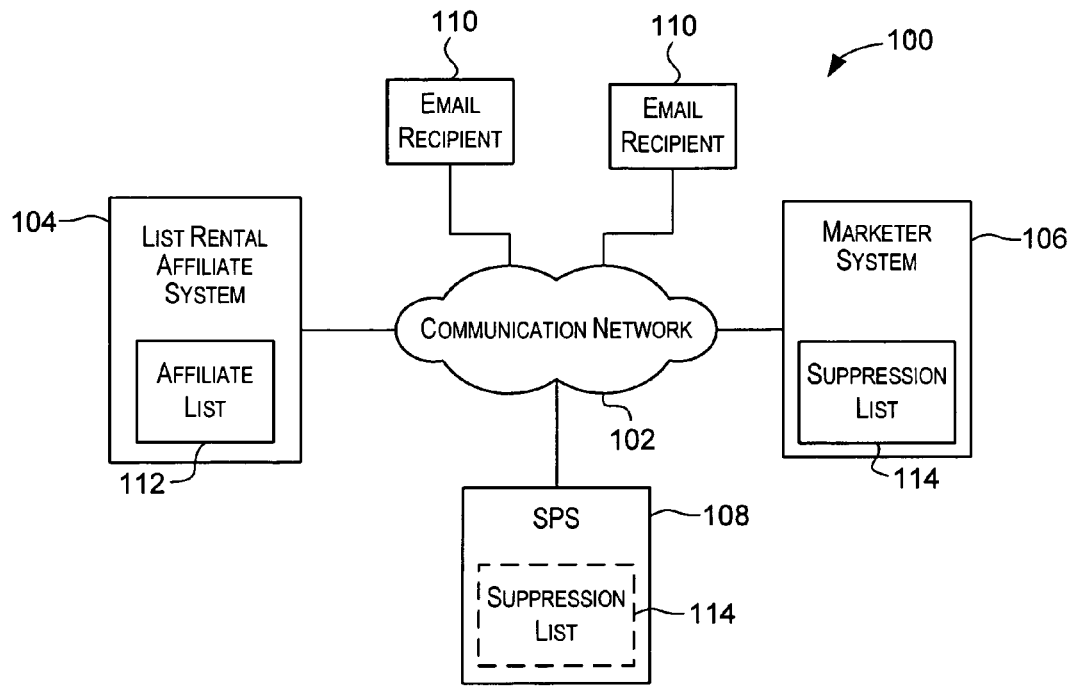
FIG. 1 is a simplified block diagram of a network environment that may incorporate an embodiment of the present invention.

FIG. 1 is a simplified block diagram of a network environment 100 that may incorporate an embodiment of the present invention. Network environment 100 depicted in FIG. 1 is merely illustrative of an embodiment incorporating the present invention and does not limit the scope of the invention as recited in the claims. One of ordinary skill in the art would recognize other variations, modifications, and alternatives.

As depicted in FIG. 1, network environment 100 comprises a plurality of computer or data processing systems coupled to a communication network 102. The systems depicted in FIG. 1 include a list rental affiliate system 104 ("affiliate system 104"), a marketer system 106, a service provider system 108 ("SPS 108"), and multiple email recipient systems 110. Communication network 102 provides a mechanism for allowing communication between the various systems depicted in FIG. 1. Communication network 102 may be a local area network (LAN), a wide area network (WAN), a wireless network, an Intranet, the Internet, a private network, a public network, a switched network, or any other suitable communication network. Communication network 102 may comprise many interconnected computer systems and communication links. The communication links may be hardwire links, optical links, satellite or other wireless communications links, wave propagation links, or any other mechanisms for communication of information. Various communication protocols may be used to facilitate communication of information via the communication links, including TCP/IP, HTTP protocols, extensible markup language (XML), wireless application protocol (WAP), protocols under development by industry standard organizations, vendor-specific protocols, customized protocols, and others.

Affiliate system 104 represents a system of an affiliate party whose list of email addresses can be "rented" by one or more marketers. Affiliate system 104 may store a list or set of email addresses 112 ("affiliate list") that the affiliate may "rent" out to other marketers. Marketers can then run email campaigns against the rented affiliate list. When a list of addresses is rented to a marketer, affiliate system 104 is configured to send emails to email addresses in the "rented" list on behalf of the marketer.

Marketer system 106 represents a system of a marketer party. The marketer may "rent" email addresses from an affiliate. Marketer system 106 may store information identifying a list or set of unsubscribed email addresses ("suppression list" 114) comprising email addresses to which emails are not to be sent during an email mailing campaign. Suppression list 114 may be updated on a regular basis. For example, when an unsubscribe request is received by marketer system 106, the email address corresponding to the unsubscribe request is added to suppression list 114. Marketer system 106 may also maintain and store its own list of email addresses to be included in email campaigns.

Accordingly, suppression list 114 may comprise a set of unsubscribed email addresses (e.g., email addresses of people who were once subscribed but later unsubscribed). Suppression list 100 may also comprise a set of email addresses that the marketer does not wish to send emails to under any circumstances whether they were ever subscribed or not. Suppression list 114 may also comprise a set of address patterns, domains, user names, etc. that the marketer does not wish to send emails to under any circumstances. These may include for example, emails addresses matching regular expressions such as *@ftcv.gov, abuse@*, etc.

SPS 108 represents a system that is configured to determine email addresses that occur both in suppression list 114 and in affiliate list 112 such that information that is not commonly held by the affiliate and the marketer is not disclosed to the other party. SPS 108 may also be configured to provide suppression services for email addresses that are determined to occur in both lists. According to an embodiment of the present invention, SPS 108 may be hosted by a third party service provider such as Digital Impact Inc. of San Mateo, Calif. In some embodiments, SPS 108 may also host suppression lists 114 for one or more marketers. Further details related to processing performed by SPS 108 are provided below.

In general, systems 104, 106, and 108 may be hosted by the same or different companies. For example, in one embodiment, a third party service provider may host one or more of systems 104, 106, and 108.

Figure 2:
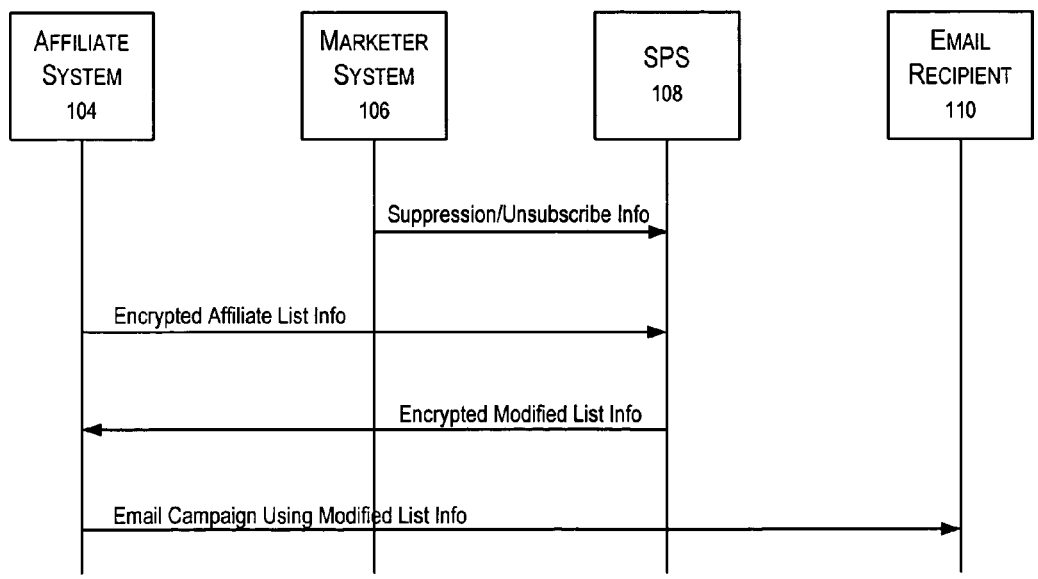
FIG. 2 depicts a flow of information between the various systems depicted in FIG. 1 according to an embodiment of the present invention.

FIG. 2 depicts a flow of information between the various systems depicted in FIG. 1 according to an embodiment of the present invention. As depicted in FIG. 2, SPS 108 receives suppression list information from one or more marketing systems 106. The suppression list information may comprise a set of encrypted strings, where each encrypted string corresponds to an email address to be suppressed and is generated by encrypting the email address. In some embodiments, the suppression list information may include a set of unencrypted (or plaintext) email addresses that are to be suppressed. If the email addresses are in plaintext form, then SPS 108 may be configured to encrypt the addresses to generate corresponding encrypted strings. Each email address is individually encrypted.

As described above, in certain embodiments, SPS 108 may host the suppression list information for a marketer. In such an embodiment, SPS 108 may use the hosted suppression information and need not receive any additional information from marketer system 106. The hosted information may be in encrypted or plaintext form. If the hosted suppression list email addresses are in plaintext form, then SPS 108 may be configured to encrypt the addresses to generate corresponding encrypted strings. Each email address is individually encrypted.

SPS 108 also receives affiliate list information from an affiliate system 104. The affiliate list information may comprise a set of encrypted strings, where each encrypted string corresponds to an email address in the affiliate list and is generated by encrypting the email address. Although generally the affiliate list will be encrypted to safeguard the privacy of the information, in some embodiments, the affiliate list information may include a set of unencrypted (or plaintext) email addresses. If the email addresses are in plaintext form, then SPS 108 may be configured to encrypt the addresses to generate corresponding encrypted strings. Each email address is individually encrypted.

SPS 108 may receive the affiliate list information and/or the suppression list information at regular intervals or at specific times. In one embodiment, affiliate system 104 may be configured to upload the affiliate's list of addresses to SPS 108 and marketer system 106 may be configured to upload the suppression list information. Various other communication techniques may also be used for communicating the affiliate list information and/or suppression list information to SPS 108 or enabling SPS 108 to pull list information and/or suppression list information from system 104 and/or system 106.

According to the teachings of the present invention, the encryption techniques used for encrypting the plaintext affiliate list addresses and the suppression list addresses are such that for a given input text string (plaintext), the encryption techniques produce the same ciphertext or encrypted string. According to an embodiment of the present invention, the same encryption technique is used for encrypting both the email addresses in the affiliate list and the email addresses in the suppression list. Examples of encryption techniques that may be used include one-way hashing techniques such as Secure Hashing Algorithm v1 (SHA-1), SHA-256, SHA-384, SHA-512, MD5, and others.

SPS 108 is configured to compare the encrypted strings in the suppression list and the encrypted strings in the affiliate list to identify any matching encrypted strings. Since the encryption techniques used for encrypting the plaintext affiliate list addresses and the suppression list addresses are such that for a given input text string (plaintext), the encryption techniques produce the same ciphertext or encrypted string, the matching encrypted strings correspond to email addresses that occur both in the suppression list and the affiliate list and represent information that is held in common by the marketer and the affiliate.

SPS 108 is then configured to prepare a modified list of encrypted strings that consists of encrypted strings from the affiliate list excluding any matching encrypted strings. In one embodiment, the modified list may be determined by removing the matching encrypted strings from the encrypted strings in the affiliate list. The modified list thus comprises encrypted strings corresponding to email addresses that are included in the affiliate's list but are not present in the marketer's suppression list. In this manner, SPS 108 determines email addresses are present in the affiliate list and the suppression list and removes them from the affiliate's email list.

SPS 108 then communicates the modified list comprising encrypted strings to affiliate system 104. Affiliate system 104 may then send emails to the addresses corresponding to the encrypted strings included in the modified list. In one embodiment, SPS 108 may be configured to determine plaintext email addresses corresponding to the encrypted strings in the modified list and communicate the decrypted email addresses to affiliate system 104. Affiliate system 104 may then send emails to the decrypted email addresses in the modified list. In this manner, emails are not sent to email addresses included in the marketer's suppression list and suppression of email addresses is achieved.

The processing described above ensures that email addresses that are included in the marketer's suppression list but not included in the affiliate's list of addresses are not disclosed to the affiliate. Likewise, the processing ensures that email addresses that are included in the affiliate's list but not in the marketer's suppression list are not disclosed to the marketer. Accordingly, information that is not held in common by the two parties is not disclosed to the other party.

Figure 3:
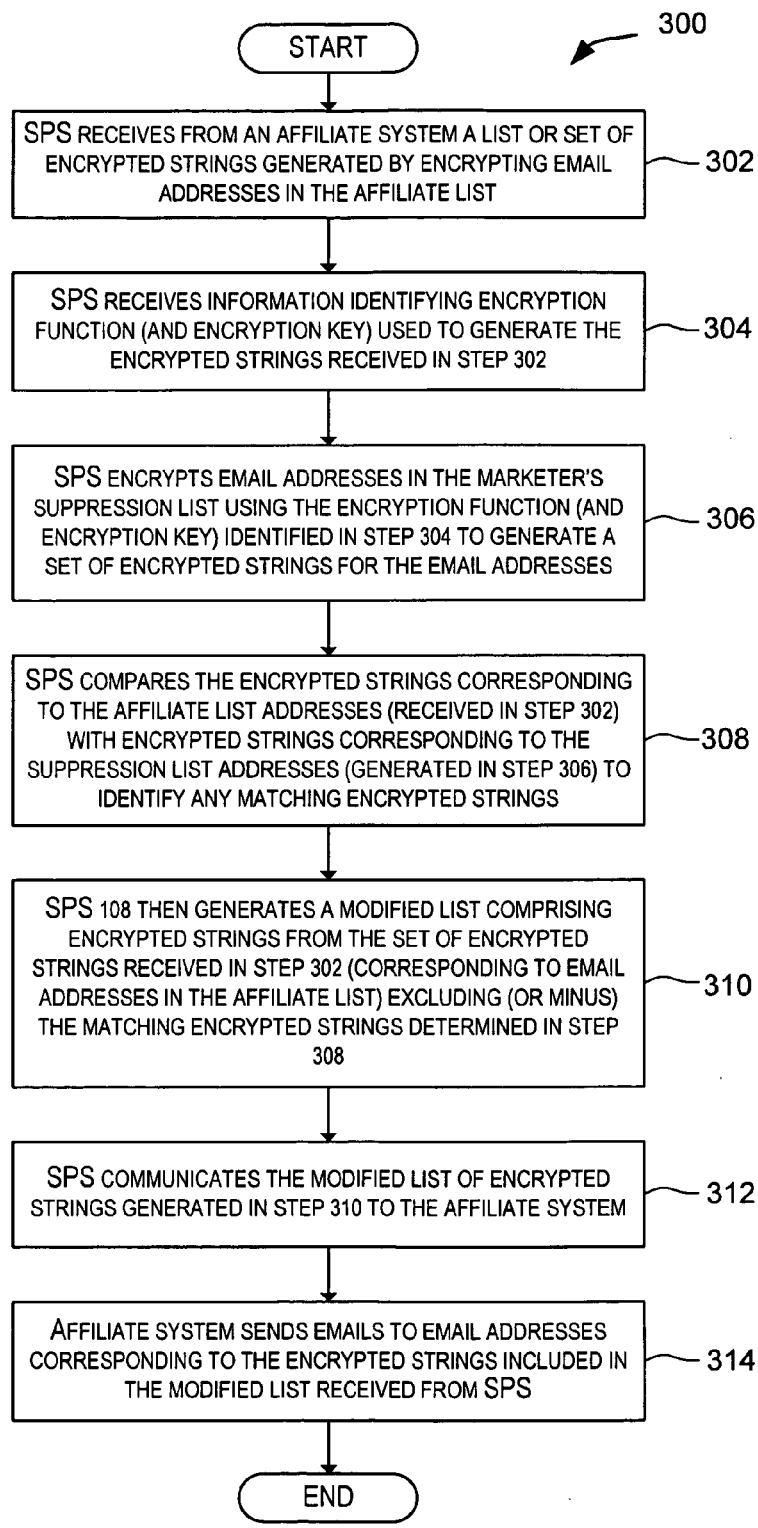
FIG. 3 is a simplified high-level flowchart depicting processing performed to enable suppression of emails to email addresses according to an embodiment of the present invention.

FIG. 3 is a simplified high-level flowchart 300 depicting processing performed to enable suppression of emails to email addresses according to an embodiment of the present invention. The processing depicted in FIG. 3 may be performed by software modules executed by a processor, hardware modules, or combinations thereof. Flowchart 300 depicted in FIG. 3 is merely illustrative of an embodiment of the present invention and is not intended to limit the scope of the present invention. Other variations, modifications, and alternatives are also within the scope of the present invention. The method depicted in FIG. 3 may be adapted to work with different implementation constraints. It is assumed for purposes of describing flowchart 300 that the processing is performed by SPS 108.

As depicted in FIG. 3, processing is initiated when SPS 108 receives a list or set of encrypted strings from affiliate system 104 that are generated by encrypting email addresses in the affiliate list (step 302). Each email address is separately encrypted to generate the corresponding encrypted string. Various techniques may be used for communicating the encrypted strings from affiliate system 104 to SPS 108. SPS 108 may receive the encrypted information at periodic time intervals or at specific times prior to conducting an email campaign.

As stated above, processing performed by the present invention is based upon the premise that the encryption technique used for encrypting the email addresses is such that if two plaintext email addresses (either in the affiliate list or the suppression list) are the same, then the encrypted strings or ciphertext produced by encrypting the plaintext email addresses are also the same and thus can be compared. One way in which this may be achieved is to use the same encryption technique to encrypt the email addresses in the affiliate list and the suppression list. Accordingly, in addition to the encrypted strings, SPS 108 may receive information from affiliate system 104 identifying the encryption scheme/technique/function that was used to encrypt the email addresses in the affiliate list to produce the encrypted strings received in step 302 (step 304).

According to an embodiment of the present invention, a shared encryption key or hash key (or "salt") may also be used in the encryption process. In one embodiment, the hash key is appended to each email address in the affiliate list prior to encryption of the email address. The addresses are then encrypted using an encryption function such as a secure one-way hashing algorithm. Examples of one-way hashing algorithms include SHA-1, SHA-256, SHA-384, SHA-512, MD5, and others. Accordingly, if a shared encryption or hash key is used as part of the encryption process, then information identifying the shared encryption or hash key may also be received in step 304.

SPS 108 then encrypts the plaintext email addresses in the marketer's suppression list using the encryption technique (and possibly the specific encryption key) identified in step 304 to generate a set of encrypted strings (step 306). For example, if an SHA-1 algorithm was used to encrypt the affiliate email addresses, then the SHA-1 algorithm may also be used to encrypt the email addresses in the marketer's suppression list. If an encryption key (e.g., a shared hash key) was used, then the shared hash key identified by the information received in step 304 may also be used for the encryption. For example, the encryption key may be appended to the plaintext email addresses in the suppression list before the addresses are encrypted. Accordingly, a list or set of encrypted strings corresponding to the email addresses in the suppression list is generated in step 306.

SPS 108 then compares the encrypted strings corresponding to the affiliate list addresses (received in step 302) with the encrypted strings corresponding to the suppression list addresses (generated in step 306) to identify any matching encrypted strings (step 308). The encrypted strings beings compared may comprise alphanumeric characters, symbols, etc. The comparison in step 308 is made possible by the fact that the encryption techniques used for encrypting the affiliate list addresses and the suppression list addresses produce the same ciphertext for a given input text string. Accordingly, if a first plaintext email address in the affiliate list is the same as a second email address in the suppression list, the encrypted strings generated for the first and second email addresses will match and will be identified in step 308. Accordingly, in step 308, SPS 108 determines all matching encrypted strings (i.e., determines the intersection of the set of encrypted strings corresponding to affiliate list addresses and the set of encrypted strings corresponding to the suppression list addresses).

SPS 108 then generates a modified list comprising encrypted strings from the set of encrypted strings received in step 302 (corresponding to email addresses in the affiliate list) excluding (or minus) the matching encrypted strings determined in step 308 (step 310). Accordingly, matching encrypted strings determined in step 308 are removed from the encrypted strings (corresponding to the affiliate list addresses) that are received in step 302 to generate the modified list of encrypted strings. The encrypted modified list (EncModList) is thus created by subtracting from the encrypted addresses from the affiliate list (EncAffList), the intersection of the encrypted strings for the affiliate list and the encrypted strings for the suppression list (EncSuppList).

$$EncModList = EncAffList - (EncAffList \cap EncSuppList)$$

The modified list of encrypted strings is then communicated to affiliate system 104 (step 312). Affiliate system 104 may then conduct an email campaign by sending emails to email addresses corresponding to the encrypted strings included in the modified list received from SPS 108 (step 314). In this manner, emails are not sent to email addresses that are included in both the affiliate's list of addresses and in the marketer's suppression list. Consequently, emails to email addresses that are included in the marketer's suppression list and also in the affiliate's list are suppressed.

Affiliate system 104 may use various techniques to determine the plaintext email addresses corresponding to the encrypted strings included in the modified list received from SPS 108. According to one technique, an unencrypted record identifier (ID) is associated with each encrypted string and its corresponding unencrypted plaintext email address. The unencrypted record ID may be for example, a primary key in a relational database management system (RDBMS) corresponding to the unencrypted email address record. When such an ID is provided, the modified list also retains an unencrypted ID for each encrypted string included in the encrypted modified list. Upon receiving the modified list, affiliate system 104 may determine an unencrypted email address corresponding to an encrypted string in the modified list using the unencrypted ID associated with the encrypted string.

According to another technique, affiliate system 104 may store a mapping between the unencrypted email addresses and their encrypted representations. The mapping may be stored in a location accessible (e.g., in a database) to affiliate system 104. Upon receiving a modified list of encrypted strings, affiliate system 104 may compare the encrypted strings in the modified list to the encrypted strings stored in the database to find matching encrypted strings and then use the mapping information to determine the corresponding unencrypted email addresses.

Affiliate system 104 may also use various other techniques to determine unencrypted email addresses corresponding to the encrypted strings included in the modified list received from SPS 108. Affiliate system 104 may then run an email campaign by sending emails to the unencrypted email addresses.

As depicted in FIG. 3, according to an embodiment of the present invention, the processing depicted in steps 302, 304, 306, 308, 310, and 312 may be performed by SPS 108. The processing may be performed by hardware modules of SPS 108, software modules executed by SPS 108, or combinations thereof. The processing in step 314 may be performed by affiliate system 104.

In alternative embodiments, the processing described above may be performed by affiliate system 104, by marketer system 106, or by affiliate system 104, individually or in combination. For example, affiliate system 104 may send an encrypted affiliate list to marketer system 106. Marketer system 106 may then prepare the modified list and communicate the modified list to affiliate system 104. In another embodiment, the marketer system 106 may send an encrypted suppression list to affiliate system 104. Affiliate system 104 may then determine the modified list.

Flowchart 300 depicted in FIG. 3 assumes that SPS 108 has access to unencrypted suppression list information and then encrypts the addresses in the suppression list using the encryption function (and possibly encryption key) information received from affiliate system 104. However, in an alternative embodiment, SPS 108 may only have access to the encrypted suppression list information comprising encrypted strings corresponding to suppression list email addresses.

In an alternative embodiment, instead of sending a modified list to affiliate system 104 comprising encrypted strings corresponding to email addresses to which emails are to be sent, SPS 108 may send a list comprising the matching encrypted strings (determined in step 308) corresponding to the email addresses to be removed from the affiliate list. Affiliate system 104 may then suppress sending emails to email addresses corresponding to the matching encrypted strings.

In the processing described above, the affiliate does not have access to email addresses that are included in the marketer's suppression list. Only those addresses that appear both in the affiliate list and in the suppression list are disclosed to the affiliate. This does not violate privacy policies of either the affiliate or the marketer since the common addresses represent information that is known to both the affiliate and the marketer (or held in common by both parties) even before the information exchange. The affiliate is prevented from determining email addresses that are included in the marketer's suppression list but are not included in the affiliate's list of addresses. Likewise, email addresses included in the affiliate list but not in the suppression list are not disclosed to the marketer. Accordingly, embodiments of the present invention ensure privacy of information that is not held in common by the two parties. Accordingly, embodiments of the present invention provide techniques for enabling suppression of emails without violating the privacy policies of either the affiliate or the marketer.

Secure List Exchange Format

According to an embodiment of the present invention, a special format (the Secure List Exchange format or SLE format) is provided for communication of information between the various entities that facilitate suppression of email addresses. Affiliate system 104 may be configured to communicate affiliate list information to SPS 108 according to the SLE format. The SLE format provides an efficient way for communication of encrypted affiliate list addresses to SPS 108. The SLE format also enables affiliate system 104 to communicate information regarding the encryption technique that was used to encrypt the affiliate email addresses. Other information that may be communicated using the SLE format include information identifying an encryption key, if any, used to perform the encryption, character encoding information, record ID information, and other information that may be used by SPS 108 to perform processing as described above.

The suppression list information may also be configured according to the SLE format. In one embodiment, marketer system 106 may be configured to format the suppression list information according to the SLE format and then communicate the information to SPS 108. In embodiments where SPS 108 is configured to host the suppression list information for a marketer, SPS 108 may be configured to format the hosted suppression list according to the SLE format.

The SLE format also facilitates comparison of encrypted strings corresponding to email addresses in the affiliate list and email addresses in the suppression list. The SLE format thus increases the overall efficiency of processing performed according to an embodiment of the present invention, especially when a large number of email addresses are involved in the processing.

According to an embodiment of the present invention, the SLE format enables encapsulation of both public and private (encrypted) data in a single document. SLE documents are documents encoded in the character set specified in a Pre-encrypted or pre-hashed Character Encoding object included in the SLE document. According to an embodiment of the present invention, a SLE document comprises the following data objects or information:

(1) Encryption Function Information: This information or object identifies an encryption function that was used for the encryption. For example, if an SHA-1 function was used to encrypt the email addresses, then the word "SHA-1" may be specified. An entry of "None" indicates that no encryption was performed.

(2) Secure Hashing Function Key (Salt) Information: As described above, a hashing key or salt may be used prior to the encryption or hashing. The key used as the salt may be identified here. The key may be case sensitive and of any length. A "None" entry may indicate use of a standard hashing without the use of a key.

(3) Pre-encrypted Character Encoding Information: This information identifies the character encoding of the original data. Examples of values include "US-ASCII", "ISO-8859-1", "UTF-8", "UTF-16BE", "UTF-16LE", "UTF-16", and the like. The reasons for including this information in the SLE format are given below.

(4) US-ASCII Encryption Test Record: This information represents a mutually disclosed plaintext string encrypted according to the Encryption Function identified in (1) above and according to the Secure Hashing Function Key (Salt) identified in (2) and in a known Pre-encrypted Character Encoding, e.g., US-ASCII. Inclusion of the test record by the sending system allows the receiving system to verify that it is able to encrypt information in a manner identical to that done by the sending system. The receiving system may use the encryption information to encrypt the same, mutually disclosed plaintext and compare the result of that encryption with the US-ASCII Encryption Test Record. Identifying problems in implementing the encryption function identically to the sending system at an early stage in the process prevents the return of a Modified Encrypted List created under incorrect assumptions about the nature of the encryption process.

(5) International Encryption Test Record: This information represents a mutually disclosed plaintext string encrypted according to the Encryption Function identified in (1) above and according to the Secure Hashing Function Key (Salt) identified in (2) and in the Pre-encrypted Character Encoding identified in (3). Inclusion of the test record by the sending system allows the receiving system to verify that it is able to encrypt information in a manner identical to that done by the sending system. The receiving system may use the encryption information to encrypt the same, mutually disclosed plaintext and compare the result of that encryption with the International Encryption Test Record. Identifying problems in implementing the encryption function identically to the sending system at an early stage in the process prevents the return of a Modified Encrypted List created under incorrect assumptions about the nature of the encryption process. This object may be left empty.

(6) Encrypted strings corresponding to plaintext email addresses, OR a plaintext list of email addresses: A list of encrypted strings generated from encrypting email addresses may be provided. The encryption function described in (1), and possibly using the key identified in (2) may be used to generate the encrypted strings. According to an embodiment of the present invention, the encrypted data is encoded in base 16. Other appropriate encoding schemes may also be used. In other embodiments, plaintext email addresses may be included.

(7) Plaintext List of Email Address Identifiers: In some embodiments of the present invention, plaintext (i.e., unencrypted) identifiers (e.g., record IDs) may be associated with each encrypted email address. As previously described, the address identifiers may be used to determine unencrypted email addresses corresponding to encrypted strings.

Please note that all the data objects and information described above may not be required in embodiments of the present invention. Subsets of the data described above may be communicated in other ways or may be mutually disclosed assumptions built into the processing logic of systems generating files in the SLE format and systems processing files in the SLE format.

As described above, the SLE format provides a placeholder for specifying the pre-encrypted character encoding information. This is done to take into account internationalization issues associated with email addresses. Historically email addresses were comprised solely of US-ASCII characters. However, since 1992, Internet Society Requests For Comment (RFCs) has proposed internationalization of various parts of email messages. Although not all of these proposals have yet attained the status of a "standard", nor are all fully implemented and supported by mail applications, the SLE format takes the internationalization issues into account.

The majority of data that is exchanged between two parties is not original source data but rather, an encrypted form of the source data. The encryption process outputs data that is US-ASCII (a hexadecimal representation of the binary data encrypted). Therefore one may think that the character encoding of the source data is irrelevant, but this assumption is not always true.

Both parties need to mutually understand the character encoding of the source data. If the same plaintext strings are to be encrypted to generate the same ciphertext strings, the encoding of the characters in the strings needs to be the same. For example, if "josé@compañía.com" is encoded in UTF-8, the resulting hash code (message digest) may not be the same as if it were encoded in ISO-8859-1. This is true because an encryption function such as a hash function operates on binary values, not on the appearance of characters made from those binary values. Even if the addresses are not encrypted by the affiliate, the encoding of the data is still relevant as the list may contain an address with non-US-ASCII characters.

For these reasons, in the Secure List Exchange format, the character encoding of the original (pre-encrypted) data is specified. If the character encoding is not correctly specified, matches against addresses composed solely of US-ASCII characters may be accurate, but matches against addresses with non-US-ASCII characters may not be accurate and may not be identifiable by the system.

According to an embodiment of the present invention, the data objects and information described above are arranged in a SLE formatted document as shown below. The token "[line break]" in the following document may be a UNIX line break (\n) a Windows line break (\r\n) or a Mac OS line break (\r) or other operating system line break. The token "[tab]" is US-ASCII 9 (\t).

Encryption Function Information [line break]
Secure Hashing Function Key [line break]
Pre-encrypted Character Encoding
Encryption Test Record [line break]
International Encryption Test Record [line break]
1st email address [tab] 1st email address identifier [line break]
2nd email address [tab] 2nd email address identifier [line break]
3rd email address [tab] 3rd email address identifier [line break]
. . .
nth email address [tab] nth email address identifier [line break]

Sample SLE Formatted Document

Example 1 shown below is an example of an unencrypted list of email addresses with no email address identifiers formatted according to SLE format. The blank line is left blank to indicate a blank International Encryption Test Record.

None
None
US-ASCII
abc
jsmith@company.com
bjones@example.com
john.doe@school.edu
. . .

Example 1

Example 2 shown below is an example of an encrypted list of email addresses with no email address identifier. The three encrypted (hashed) strings shown in Example 2 may be generated by encrypting the plaintext email addresses depicted in Example 1. SHA-1 is identified as the encryption function and "my secret key for 20 Feb. 2004" is the encryption key.

SHA-1
my secret key for 20 Feb. 2004
US-ASCII
8A0539052CF0598C0A6ED08E54D1E3CD5D5F8419
84FCD7553867FBC421A7DBCB91D50130BC393996
5BFC727EEEFB285C94ACE5E2B050373E035A401E
98C93BE31929CD49E2709F11890BD2FD082A1BE6
. . .

Example 2

Example 3 shown below is an example of encrypted strings corresponding to email addresses along with a plaintext email address identifier associated with each encrypted string. The pre-hashed encoding is UTF-8. The three encrypted (hashed) strings shown in Example 3 may be generated by encrypting the plaintext email addresses depicted in Example 1. Since those addresses contain only US-ASCII characters, the hashed form is the same as in Example 2. As previously described, affiliate system 104 may use the address identifiers to determine unencrypted email addresses corresponding to the encrypted strings.

SHA-1
my secret key for 20 Feb. 2004
UTF-8
8A0539052CF0598C0A6ED08E54D1E3CD5D5F8419
84FCD7553867FBC421A7DBCB91D50130BC393996
10034
5BFC727EEEFB285C94ACE5E2B050373E035A401E
11091

98C93BE31929CD49E2709F11890BD2FD082A1BE611384

...

Example 3

Encryption Functions

Various encryption functions may be used in embodiments of the present invention. For example, one-way hashing functions, or public key encryption scheme may be used that produce the same ciphertext for a given plaintext.

One-way hashing schemes are normally employed to ensure data integrity, that is, to verify that data has not been altered in transit. In embodiments of the present invention, a one-way hashing scheme is a good way to ensure that the ciphertext produced for a given plaintext is always the same. A salt may be used along with the encryption function provided that the salt and its method of use are disclosed to all parties performing encryption.

Other popular encryptions schemes, including public key schemes, that are capable of producing the same ciphertext for a given input text string may also be used. Most public key encryption schemes use a "salt" for additional security. The "salt" may be different in nature than the "salt" described above in that the "salt" may not be known by either party or the "salt" used to encrypt data may bit be unknown to the second party.

According to an embodiment of the present invention, the encryption hashing function used by the SLE format is SHA-1 (Secure Hashing Algorithm version 1). SHA-1 is a successor to SHA (now known as SHA-0). SHA-1 is used because it is highly secure, very fast to compute and supported by both open source and proprietary implementations on most major platforms in most major programming languages. Further, SHA-1 has also been included as one of four hashing functions permitted by the National Institute of Standards and Technology (NIST) in their Federal Information Processing Standard (FIPS) 180-2. The four hashing functions permitted by the NIST are deemed secure because, for any of the four functions, it is computationally infeasible (1) to find a message (i.e., plaintext) that corresponds to a given message digest (i.e., ciphertext), or (2) to find two different messages that produce the same message digest.

Additional information on SHA-1 may be found at the following locations: (1) the NIST home page; (2) the FIPS 180-2 publication on the NIST site; (3) the Internet Society Request For Comment (RFC) 3174; (4) and the open source Cryptix library.

As previously indicated, implementations of SHA-1 are available for a plurality of platforms in a plurality of languages. For example, SHA-1 implementations can be found at the following resources:

(1) Perl implementation: Digest::SHA1;

(2) Java® implementation (standard in JDK 1.3 and later), MessageDigest (Java® is a registered trademark of Sun Microsystems, Inc. of Santa Clara, Calif.);

(3) Python implementation (standard in current version), sha (Python™ is a trademark of the Python Software Foundation);

(4) PHP implementation (standard in current version), sha1;

(5) .NET implementation (standard in current version), SHA1;

(6) MySQL implementation (standard in version 4.0 and later), SHA1;

(7) Oracle implementation (through PL/SQL library from 3rd parties) (Oracle® is a registered trademark of Oracle Corporation of Redwood Shores, Calif.);

(8) SQLServer implementation (through PL/SQL library from 3rd parties);

In addition to SHA-1, various other encryption schemes may also be used. The following is a short list of the encryption schemes that may be used. The list provided below is not intended to be an exhaustive list of all the encryption schemes/functions that can be used but a sampling of the commonly usable schemes.

(1) Variants of SHA such as SHA-256, SHA-384, SHA-512, SHA-1 plus per-session key;

(2) MD5 and its variants;

(3) Hash Message Authentication Code (HMAC)-SHA-1 plus per-session key: HMAC is defined by RFC 2104. Several implementations for HMAC are available including implementations for Perl, Python, .NET, open sources, Java, etc;

(4) Public key schemes: Schemes using a public/private key pair may be used. In one embodiment, affiliate system 104 may encrypt the email addresses in the affiliate list using the affiliate's public key, and send the encrypted data to SPS 108 along with the affiliate's public key. SPS 108 may then encrypt the addresses in the suppression list with the same public key, remove duplicates and return the modified encrypted list to affiliate system 104. Affiliate system 104 may then decrypt the encrypted strings in the modified list with the affiliate's private key. Some schemes such as RSA algorithm insert a "salt" or additional bit of random data into each block it is encrypting. The result of this is that the same plaintext address (e.g. foo@bar.com) will not generally produce the same ciphertext. In embodiments of the present invention, RSA may be configured such that it does not introduce the salt, and in fact, original versions of RSA (basic RSA) did not use the salt.

(5) Check-sum schemes: Check-sum schemes are widely used to verify that information is accurately transmitted. Because they are one-way functions, they may also be used in embodiments of the present invention in a manner similar to the one-way hash algorithms as described above. Examples of check-sum algorithms include CRC-32 and Adler-32.

Encryption Procedures

According to an embodiment of the present invention, the following procedures are used for encrypting email addresses using the SHA-1 technique. These procedures are merely examples of how encryption of email addresses may be performed according to an embodiment of the present invention and are not intended to limit the scope of the present invention a recited in the claims.

(a) Email addresses in the Affiliate List are encrypted using an RFC-3174 (SHA-1) compliant algorithm.

(b) Email addresses are converted to lower-case characters and then encrypted (e.g. "jsmith@company.com" is encrypted, not "JSmith@Company.COM")

(c) Email addresses do not contain any leading or trailing white space characters.

(d) Resulting hash values (message digests) are encoded in base 16 (as described below in the "Data Encoding" section).

(e) If a single hash object is used repeatedly for a set of addresses, the object is reset between each use. This ensures that each digest is just a digest of a single address, and not a digest of the concatenation of all addresses processed up to that point.

(f) If the key (salt) has value "None", nothing is appended to the email address (not even a null value or an empty string value (" ")).

(g) If the key (salt) has a value other than "None", the key value is appended to every email address in the list prior to hashing. According to an embodiment of the present invention, the key is directly appended as in the following pseudocode example.

```
if(salt !=null && salt 1=
{
emailAddress=emailAddress+salt
}
digest=sha1.digest(emailAddress);
```

Example Pseudo Code

Data Encoding

Most encryption algorithms operate on binary data. This is done largely for efficiency reasons where it enables chaining of encryption functions. Chaining of encryption functions is where data encrypted by one method is then encrypted a second time by the same or another function.

However, binary data is difficult to transmit in documents for several reasons such as that fact that different platforms assign significance to binary digits differently (e.g. little endian vs. big endian). Therefore, data is usually encoded in a form for easy transmission through the Internet. Common encoding schemes include base 64 and base 16 (hexadecimal or "hex"). It is common in the cryptographic community to encode hash values (also known as message digests) in base 16. According to an embodiment of the SLE format, the values are encoded in base 16. Case sensitivity may not matter. (i.e. the string "10abc" would be considered an accurate match of "10ABC"). Other encoding schemes may be used in alternative embodiments.

Several implementations of SHA-1 make it very easy to obtain a base 16 encoding of the hash value. A brief discussion of some implementations follows:

(1) Perl Implementation: The "Digest::SHA1" object in Perl has a function to obtain the message digest in base 16. The function may be called in functional or object oriented style. The following example reads a list of email addresses found in a file called "emails.txt". For each address read, the program prints a base 16 encoded SHA-1 hash value of the email address with an appended key or "salt".

```perl
#!/usr/bin/perl
use strict;
use Digest::SHA1
my $msg;
my $hex;
my $sha;
my $salt="my secret key for 20 Feb. 2004";
open(FILE, "emails.txt");
$sha=Digest::SHA1->new; # create a digest instance
while(<FILE>) {
# Remove any trailing line feed and/or carriage returns
   from the line
# of text read from the file.
s/\n//g; # remove line feed
s/\r//g; # remove carriage return
$msg=$_; # set msg to the current line of text from the file
   if (salt ne " ") {$msg .=$salt;} # append salt to the
      message
$sha->reset( ); # reset the digest to clear out the last use
$sha->add($msg); # add text to the digest object
$hex=$sha->hexdigest; # obtain hex digest of text added
   thus far
print "$hex: sha1($msg)n";
}
```

PERL Example (2) Java implementation: The "MessageDigest" class in Java returns only raw bytes as a byte array (byte[ ]). Java presently does not offer a byte[ ] to hex conversion, but one can be made relatively simply by converting each byte to an Integer and obtaining the hex value of each Integer via the Integer.toHexValue( ) method. Care must be used as the Integer.toHexValue( ) method will not append leading zeros which are required by the format. The following example reads a list of email addresses found in a file called "emails.txt". For each address read, the program prints a base 16 encoded SHA-1 hash value of the email address with an appended key or "salt".

```java
import java.io.*;
import java.security.*;
public class SHA1Hasher
{
public static void main(String[ ] args) throws Exception
{
  // create a MessageDigest instance that uses SHA-1
  MessageDigest    sha1=MessageDigest.getInstance
     ("SHA-1");
  // create a buffered file reader
  FileReader fr=new FileReader("emails.txt");
  BufferedReader br=new BufferedReader(fr);
  String text=null";
  String salt="my secret key for 20 Feb. 2004";
  while((text=br.readLine( )) !=null)
  {
     if (salt !=null && !salt.equals(" ")) {text=text+salt;)
     // Get the raw bytes assuming an ISO-8859-1 encod-
        ing  byte[ ]  plaintext=text.getBytes("ISO-8859-
        1");
     byte[ ] ciphertext;
     sha1.reset( ); // reset digest to clear out last use
     ciphertext=sha1.digest(plaintext);
     System.out.println(bytesToHex(ciphertext));
  }
  // Close our input stream
  fr.close( );
}
public static String bytesToHex(byte[ ] data
{
  StringBuffer str=new StringBuffer( );
  for (int i=0; i<data.length; i++)
  {
     String hex=Integer.toHexString(0xFF & data[i]);
     // toHexString won't append a leading 0
     // so we check for that ourselves.
     if (hex.length( )==1) {str.append("0"+hex);}
     else {str.append(hex);}
  }
  return str.tostring( );
}
}
```

Java Example (3) Python implementation: The "sha" class in Python provides a "hexdigest" function which returns the hash value in base 16.

(4) PHP implementation (standard in current version and possibly earlier): The "sha1" function in PHP returns the data in base 16 by default.

(5) .NET implementation (standard in current version and possibly earlier): A solution similar to the one for Java is available for getting a hash value in base 16.

(6) MySQL 4.0: The following example shows how to select hashed email addresses directly out of MySQL 4.0. The SHA1 stored procedure is standard in the 4.0 version. In the example, it is assumed that the email addresses are stored in a table called "list" in a field called "email".

SELECT SHA1(email) FROM list

MySQL Example (7) Oracle 8x/9x/10x: Hashed email addresses may be selected directly out of Oracle. The SHA1 stored procedure may be used.

(8) SQL Server (with CTNHashProc): Hashed email addresses may be selected directly out of SQL Server, using the open source CTNHashProc extended stored procedures.

(9) Others: Other implementation in various languages for various platforms may be provided.

Examples of Encryption Results

Table 1 shows results of encrypting (hashing) plaintext strings including email addresses where key (salt) is null or empty (" ") and encoding is ISO-8859-1 according to an embodiment of the present invention.

TABLE 1

| Message | Hash Value (Message Digest) |
|---|---|
| abc | A9993E364706816ABA3E25717850C26C9CD0D89D |
| jsmith@company.com | 0362FE256BD3149F2927A75FAAA46A1C17406155 |
| bjones@example.com | 48194163624CAFDD11106D95710A3128F760B147 |
| john.doe@school.edu | 32463D8B3D352F312A06E19AB7881384B9F3CFDA |
| josé@compañia.com | 0ABE53B447BD7E7F021631CE7E089B1E83778DD9 |

Table 2 shows results of encrypting (hashing) plaintext strings including email addresses where appended key (salt) is "my secret key for 20 Feb. 2004" and encoding is ISO-8859-1 according to an embodiment of the present invention.

TABLE 2

| Message | Hash Value (Message Digest) |
|---|---|
| abc | 8A0539052CF0598C0A6ED08E54D1E3CD5D5F8419 |
| jsmith@company.com | 84FCD7553867FBC421A7DBCB91D50130BC393996 |
| bjones@example.com | 5BFC727EEEFB285C94ACE5E2B050373E035A401E |
| john.doe@school.edu | 98C93BE31929CD49E2709F11890BD2FD082A1BE6 |
| josé@compañia.com | 639E560F4F56C2941EB0A73E8B86DDDCF0E0327F |

Table 3 shows results of encrypting (hashing) plaintext strings including email addresses where appended key (salt) is "my secret key for 20 Feb. 2004" and encoding is UTF-8 according to an embodiment of the present invention.

TABLE 3

| Message | Hash Value (Message Digest) |
|---|---|
| abc | 8A0539052CF0598C0A6ED08E54D1E3CD5D5F8419 |
| jsmith@company.com | 84FCD7553867FBC421A7DBCB91D50130BC393996 |
| bjones@example.com | 5BFC727EEEFB285C94ACE5E2B050373E035A401E |
| john.doe@school.edu | 98C93BE31929CD49E2709F11890BD2FD082A1BE6 |
| josé@compañia.com | 8660DB7A22A2DEB5329BEF4AE11C5A9F78087E12 |

As described above, a specific embodiment of the present invention has been described that may be used in the email marketing domain. The teachings and scope of the present invention are however not limited to the email marketing domain. Teachings of the present invention may be in any domain or situation where information that is held in common by parties has to be determined without disclosing information that is not held in common by the parties.

Figure 4:
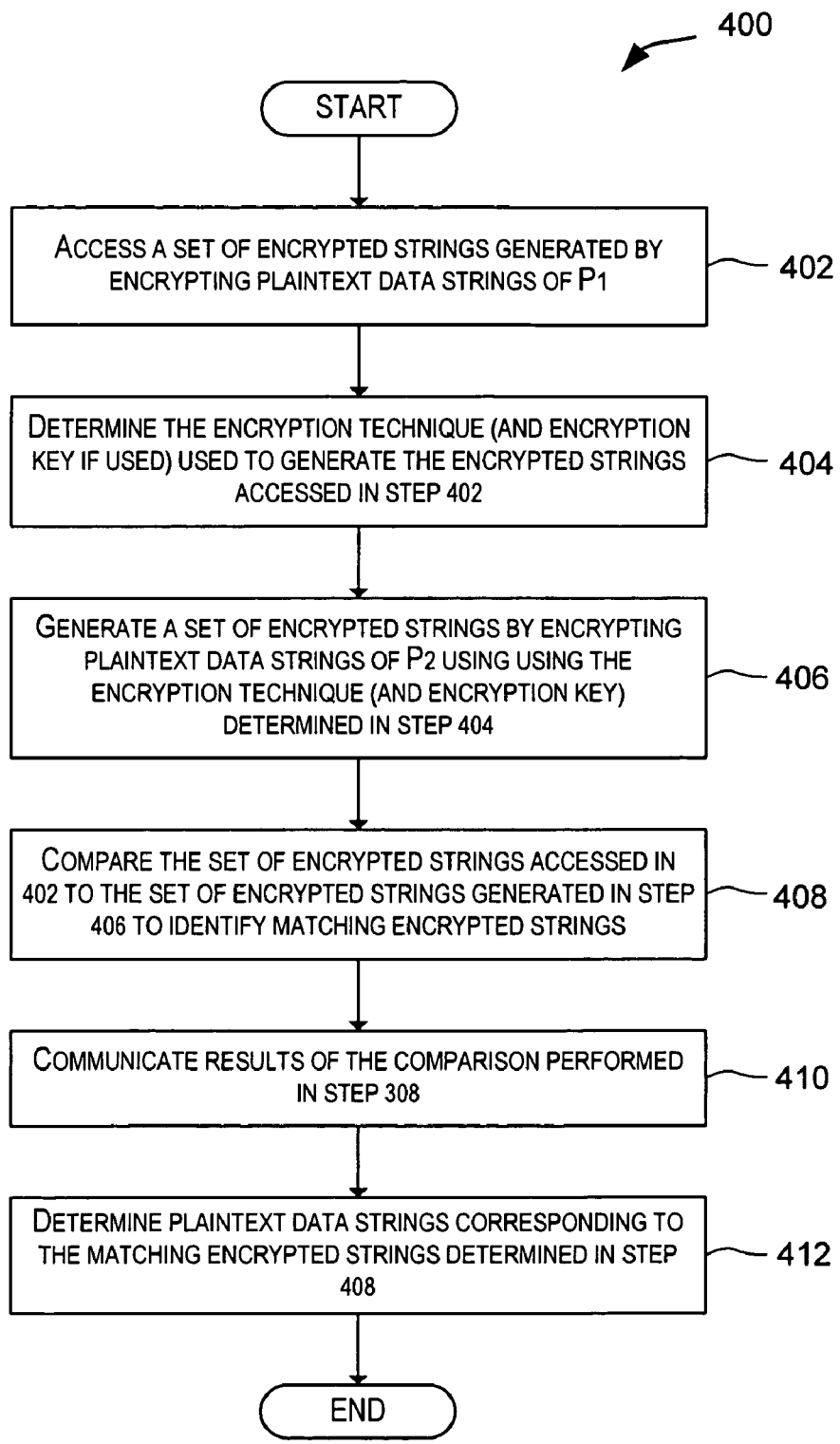
FIG. 4 depicts a simplified flowchart depicting a method for determining information that is held in common by parties without disclosing the non-commonly held information according to an embodiment of the present invention.

FIG. 4 depicts a simplified flowchart 400 depicting a method for determining information that is held in common by parties without disclosing the non-commonly held information according to an embodiment of the present invention. Flowchart 400 depicted in FIG. 4 is merely illustrative of an embodiment of the present invention and is not intended to limit the scope of the present invention. Other variations, modifications, and alternatives are also within the scope of the present invention.

For purposes of description, it is assumed for FIG. 4 that two parties, namely, P1 and P2 need to exchange information to determine information that is held in common by the parties. It is further assumed that the information for each party comprises a set of plaintext data strings, or other data that can be converted to plaintext strings through a process mutually disclosed to both parties. The plaintext data strings may comprise alphanumeric characters, symbols, etc. In the email marketing application described above, the data strings correspond to email addresses. The data strings may however correspond to any type of data such as names, codes, etc.

As depicted in FIG. 4, a set of encrypted strings that is generated by encrypting plaintext data strings of P1 is accessed (step 402). The encryption technique (and possibly an encryption key) that was used to generate the set of encrypted strings accessed in step 402 is determined (step 404). The plaintext data strings of P2 are then encrypted using the encryption technique (and possibly using the encryption key) determined in step 404 to generate a set of encrypted strings (step 406). The same encryption technique is used to ensure that the same ciphertext is generated for a given plaintext string. The set of encrypted strings accessed in step 402 are then compared with the set of encrypted strings generated in step 406 to identify matching encrypted strings (step 408).

The results of the comparison performed in step 408 may then be communicated to any interested party (step 410). For example, in one embodiment, the matching encrypted strings determined in step 408 may be communicated to P1 and/or P2. In another embodiment, information identifying encrypted strings that were included in the set of encrypted strings accessed in step 402 excluding the matching encrypted strings determined in step 408 may be communicated to P1. In yet another embodiment, information identifying encrypted strings that were included in the set of encrypted strings generated in step 406 excluding the matching encrypted strings determined in step 408 may be communicated to P2.

The parties receiving the communications in step 410 may then determine the plaintext data strings corresponding to the encrypted strings received in step 410 (step 412). Some operation may be performed using the plaintext data strings determined in step 412. For example, as described above, emails may either be sent or suppressed.

In alternative embodiments, P2 may provide a list or set of encrypted strings that have been generated using the same encryption technique as used by P1 to generate encrypted strings for P1's plaintext data strings. In this embodiment, step 406 is not required. The sets of encrypted strings received from the two parties may be compared to identify the matching encrypted strings.

As an example, another domain in which the present invention may be used is the social networking domain. Social network services allow individuals to discover friends, colleagues, co-workers, etc (referred to generally as "Acquaintances"). Social network services also enable discovery of Acquaintances of Acquaintances (to varying degrees of separation) without disclosing any individual's Acquaintance list or a means to directly contact those Acquaintances. For example, an introduction is made by the system when Person A requests contact with Person C and the system is able to identify that Person A knows Person B who knows Person C. The value of finding the network path from Person A to Person C is that Person A may then approach Person C via a reference from the mutual Acquaintance, Person B.

Conventionally, such introduction services are typically managed by a central application and central database that stores that is used for providing the services. All parties entrust their raw (unencrypted) data to the central application and have to trust the providers of the central application that the privacy of the raw data will be preserved. The central application then provides the social acquaintance discovery services based upon the data provided by the individual parties. Many individuals are however hesitant to use such services because they do not trust the level of data privacy offered by providers of such services. The individuals are apprehensive that the raw information provided to these social service systems may be used in a way harmful to the individuals.

By using embodiments of the present invention, such a service can be provided without providing raw information to any centralized application or database system. Individuals could publish their list of contacts on some publicly accessible forum (e.g., the Internet) in an encrypted form congruent with teachings of the present invention. The information would not have to be held in unencrypted form in a single, centralized database or similar repository. Accordingly, any number of third party services or even any individual could then discover a network chain leading from themselves to any known individual by accessing the encrypted contact lists of participating individuals and by matching encrypted identifiers of data already known to those individuals such as an encrypted email address. Accordingly, data that is not already known to an individual is not revealed through such a process.

For example, Person A knows Person C's email address and would like to discover a network path of mutual Acquaintances who could introduce him to Person C. Person A may find among his own contacts Person B. Person A may read Person B's encrypted contact list published on the Internet and discover that Person B's encrypted list includes Person C's encrypted email address (i.e., Person B has among his contacts Person C as identified by Person C's encrypted email address). In this manner, Person A discovers that Person B is a mutual Acquaintance that he and Person C share. Person A is not, however, able to know all the email addresses of all of Person B's acquaintances, therefore Person B's data is protected.

As another example, another domain in which embodiments of the present invention may be used is the domestic and foreign intelligence and criminal intelligence services domain. Intelligence services may be interested in knowing whether a private or public institution or other entity has had interaction or involvement with certain individuals or groups. For example, the Federal Bureau of Investigation (FBI) may be interested in knowing if any of a set of individuals has had dealings with a certain bank or set of banks (Bank). The Bank may have an obligation to protect the data of their customers, but may also have to comply with FBI requests to furnish records of interactions with known criminal suspects. If the FBI is requesting information about a large number of individuals or groups from a single Bank, the process of discovering if the Bank has had interactions with those individuals may be burdensome for the Bank to fulfill. The process could be more efficient, in this example, if the Bank could release all their records to a third party in an encrypted form congruent with the teachings of present invention. The FBI may similarly release in an encrypted form their list of individuals to the same third party. The third party could then more efficiently discover which individuals on the FBI's list are those that have had an interaction with the Bank without allowing the FBI to obtain data about other individuals and without disclosing any private information about other individuals who had interactions with the Bank to the FBI or the third party.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of processing information, the method comprising:

accessing a first set of encrypted strings, the first set of encrypted strings generated by applying a first encryption function to each plaintext string in a first set of plaintext strings having a first character encoding;

accessing a second set of encrypted strings, the second set of encrypted strings generated by applying the first encryption function to each plaintext string in a second set of plaintext strings having a second character encoding;

determining whether the first and second character encodings are the same; and if the first and second character encodings are the same, comparing the first set of encrypted strings with the second set of encrypted strings to determine a third set of encrypted strings comprising one or more encrypted strings that are included both in the first set of encrypted strings and in the second set of encrypted strings.

2. The method of claim 1 further comprising determining a plaintext string corresponding to each encrypted string in the third set of encrypted strings.

3. The method of claim 1 further comprising:
determining the first encryption function used to generate the first set of encrypted strings from the first set of plaintext strings; and
applying the first encryption function to plaintext strings in the second set of plaintext strings to produce the second set of encrypted strings.

4. The method of claim 1 wherein the first set of encrypted strings is received from a first data processing system, the method further comprising:
communicating the third set of encrypted strings to the first data processing system; and
determining, at the first data processing system, a third set of plaintext strings comprising plaintext strings included in the first set of plaintext strings excluding plaintext strings corresponding to encrypted strings included in the third set of encrypted strings.

5. The method of claim 4 wherein the first set of plaintext strings, the second set of plaintext strings, and the third set of plaintext strings comprise one or more plaintext email addresses, the method further comprising communicating an email from the first data processing system to each plaintext email address in the third set of plaintext strings.

6. The method of claim 1 further comprising determining a fourth set of encrypted strings comprising encrypted strings from the first set of encrypted strings that are not included in the third set of encrypted strings.

7. The method of claim 6 wherein the first set of encrypted strings is received from a first data processing system, the method further comprising:
communicating the fourth set of encrypted strings to the first data processing system; and
determining, at the first data processing system, a fourth set of plaintext strings comprising plaintext strings from the first set of plaintext strings corresponding to encrypted strings in the fourth set of encrypted strings.

8. The method of claim 7 wherein the first set of plaintext strings, the second set of plaintext strings, the third set of plaintext strings, and the fourth set of plaintext strings comprise one or more plaintext email addresses, the method further comprising communicating an email from the first data processing system to each plaintext email address in the fourth set of plaintext strings.

9. The method of claim 6 further comprising determining a plaintext string from the first set of plaintext strings corresponding to each encrypted string in the fourth set of encrypted strings.

10. A computer program product stored on a computer-readable medium for processing information, the computer program product comprising:
code for accessing a first set of encrypted strings, the first set of encrypted strings generated by applying a first encryption function to each plaintext string in a first set of plaintext strings having a first character encoding;
code for accessing a second set of encrypted strings, the second set of encrypted strings generated by applying the first encryption function to each plaintext string in a second set of plaintext strings having a second character encoding;
code for determining whether the first and second character encodings are the same; and
code for, if the first and second character encodings are determined to be the same, comparing the first set of encrypted strings with the second set of encrypted strings to determine a third set of encrypted strings comprising one or more encrypted strings that are included in the first set of encrypted strings and included in the second set of encrypted strings.

11. The computer program product of claim 10 further comprising code for determining a plaintext string corresponding to each encrypted string in the third set of encrypted strings.

12. The computer program product of claim 10 further comprising:
code for determining the first encryption function used to generate the first set of encrypted strings from the first set of plaintext strings; and
code for applying the first encryption function to plaintext strings in the second set of plaintext strings to produce the second set of encrypted strings.

13. The computer program product of claim 10 wherein the first set of encrypted strings is received from a first data processing system, the computer program product further comprising:
code for communicating the third set of encrypted strings to the first data processing system; and
code for determining, at the first data processing system, a third set of plaintext strings comprising plaintext strings included in the first set of plaintext strings excluding plaintext strings corresponding to encrypted strings included in the third set of encrypted strings.

14. The computer program product of claim 13 wherein the first set of plaintext strings, the second set of plaintext strings, and the third set of plaintext strings comprise one or more plaintext email addresses, the computer program product further comprising code for communicating an email from the first data processing system to each plaintext email address in the third set of plaintext strings.

15. The computer program product of claim 10 further comprising code for determining a fourth set of encrypted strings comprising encrypted strings from the first set of encrypted strings that are not included in the third set of encrypted strings.

16. The computer program product of claim 15 wherein the first set of encrypted strings is received from a first data processing system, the computer program product further comprising:
code for communicating the fourth set of encrypted strings to the first data processing system; and
code for determining, at the first data processing system, a fourth set of plaintext strings comprising one or more plaintext strings from the first set of plaintext strings corresponding to encrypted strings in the fourth set of encrypted strings.

17. The computer program product of claim 16 wherein the first set of plaintext strings, the second set of plaintext strings, the third set of plaintext strings, and the fourth set of plaintext strings comprise one or more plaintext email addresses, the computer program product further comprising code for communicating an email from the first data processing system to each plaintext email address in the fourth set of plaintext strings.

18. The computer program product of claim 15 further comprising code for determining a plaintext string from the first set of plaintext strings corresponding to each encrypted string in the fourth set of encrypted strings.

19. A system comprising:
a first computer;
a second computer; and
a third computer coupled with the first computer and the second computer;
wherein the third computer is configured to:
   receive a first set of encrypted strings from the first computer, the first set of encrypted strings generated by applying a first encryption function to each plaintext string in a first set of plaintext strings having a first character encoding, each plaintext string in the first set of plaintext strings having an encryption key appended thereto before applying the first encryption function;
   receive a second set of encrypted strings from the second computer, the second set of encrypted strings generated by applying the first encryption function to each plaintext string in a second set of plaintext strings having a second character encoding, each plaintext string in the second set of plaintext strings having an encryption key appended thereto before applying the first encryption function;
   determine whether the first and second character encodings are the same; and
   if the first and second character encodings are determined to be the same, compare the first set of encrypted strings with the second set of encrypted strings to determine a third set of encrypted strings comprising one or more encrypted strings that are included both in the first set of encrypted strings and in the second set of encrypted strings.

20. The system of claim 19 wherein:
the third computer is configured to communicate the third set of encrypted strings to the first computer; and
the first computer is configured to determine a third set of plaintext strings comprising plaintext strings included in the first set of plaintext strings corresponding to the encrypted strings included in the third set of encrypted strings.

21. The system of claim 19 wherein:
the third computer is configured to communicate the third set of encrypted strings to the first computer; and
the first computer is configured to determine a third set of plaintext strings comprising plaintext strings included in the first set of plaintext strings excluding plaintext strings corresponding to encrypted strings included in the third set of encrypted strings.

22. The system of claim 21 wherein:
the third set of plaintext strings comprises email addresses; and
the first computer is configured to send an email to each address in the third set of plaintext strings.

23. The system of claim 19 wherein:
the third computer is configured to:
   determine a fourth set of encrypted strings comprising encrypted strings from the first set of encrypted strings that are not included in the third set of encrypted strings; and
   communicate the fourth set of encrypted strings to the first computer; and
the first computer is configured to determine a fourth set of plaintext strings from the first set of plaintext strings corresponding to encrypted strings in the fourth set of encrypted strings.

24. The system of claim 23 wherein:
the fourth set of plaintext strings comprises email addresses; and
the first computer is configured to send an email to each email address in the fourth set of plaintext strings.

25. An apparatus comprising:
a memory;
means for receiving a first set of encrypted strings, the first set of encrypted strings generated by applying a first encryption function to each plaintext string in a first set of plaintext strings having a first character encoding, each plaintext string in the first set of plaintext strings having an encryption key appended thereto before applying the first encryption function;
means for receiving a second set of plaintext strings having a second character encoding;
means for determining the first encryption function used to generate the first set of encrypted strings from the first set of plaintext strings;
means for applying the first encryption function to plaintext strings in the second set of plaintext strings to produce a second set of encrypted strings, each plaintext string in the second set of plaintext strings having an encryption key appended thereto before applying the first encryption function;
means for comparing the first and second character encodings; and
means for, if the first and second character encodes are the same, comparing the first set of encrypted strings with the second set of encrypted strings to determine a third set of encrypted strings comprising one or more encrypted strings that are included both in the first set of encrypted strings and in the second set of encrypted strings.

26. The apparatus of claim 25 further comprising:
means for determining a plaintext string corresponding to each encrypted string in the third set of encrypted strings.

* * * * *

UNITED STATES PATENT AND TRADEMARK OFFICE
CERTIFICATE OF CORRECTION

| | | |
|---|---|---|
| PATENT NO. | : 7,610,627 B1 | Page 1 of 1 |
| APPLICATION NO. | : 10/865180 | |
| DATED | : October 27, 2009 | |
| INVENTOR(S) | : Eugene William McKenna | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1129 days.

Signed and Sealed this

Twelfth Day of October, 2010

David J. Kappos
*Director of the United States Patent and Trademark Office*